United States Patent [19]

Wirt

[11] 4,152,895
[45] May 8, 1979

[54] WAVE POWERED MOTOR

[75] Inventor: Leslie S. Wirt, Newhall, Calif.

[73] Assignee: Lockheed Corporation, Burbank, Calif.

[21] Appl. No.: 879,360

[22] Filed: Feb. 21, 1978

[51] Int. Cl.² .............................................. F03B 13/12
[52] U.S. Cl. .......................................... 60/398; 415/7
[58] Field of Search ...................... 60/398; 290/42, 43, 290/53, 54; 415/7

[56] References Cited

U.S. PATENT DOCUMENTS

| | | | |
|---|---|---|---|
| 1,751,667 | 3/1930 | Taylor | 60/398 |
| 3,912,938 | 10/1975 | Filipenco | 290/42 X |
| 3,928,771 | 12/1975 | Straumsnes | 290/43 |
| 4,025,220 | 5/1977 | Thompson | 415/7 |

Primary Examiner—Allen M. Ostrager
Attorney, Agent, or Firm—Ralph M. Flygare

[57] ABSTRACT

Apparatus for converting ocean surface wave energy into useful rotational kinetic energy. A refractive horn and ramp provides reflectionless impedance transformation of ocean surface wave energy at the input to the system. Wave energy, in the form of breakers, which are massive pulses of essentially pure kinetic energy, from the output of the horn/ramp are then smoothed and transformed directly to mechanical rotation. Smoothing is accomplished by the inertial properties of a "liquid flywheel". The rotational kinetic energy may be extracted by means of a turbine to provide useful work. Discharged water is returned to the ambient ocean through a low terminal velocity diffuser. The entire structure may be located offshore and the discharged fluids may be used for auxiliary purposes.

20 Claims, 14 Drawing Figures

WAVE POWERED MOTOR

BACKGROUND OF THE INVENTION

Heretofore, many techniques have been used in attempts to convert ocean waves to useful applications. Many of these attempts have been directed to the use of the energy of tidal oscillations induced by the motions of the moon and sun. Other schemes have been directed to harnessing wind-generated surface waves and currents, since these comprise most of the total energy budget of the ocean.

Typical examples of such schemes are those disclosed in the following patents:
U.S. Pat. No. 3,927,330 to Skorupinski
U.S. Pat. No. 3,644,052 to Lininger
U.S. Pat. No. 1,811,565 to Schwabacher
U.S. Pat. No. 1,649,644 to Alexeeff
U.S. Pat. No. 604,211 to Lofgren Patents directed to schemes for extracting tidal energy include:
U.S. Pat. No. 1,474,571 to Wielgolaski
U.S. Pat. No. 3,993,913 to Dickman Other wave motor devices are disclosed in:
U.S. Pat. No. 924,808 to Mackey
U.S. Pat. No. 757,800 to Williams
U.S. Pat. No. 3,877,835 to Siptrott None of the foregoing devices have met with significant commercial success. All such devices known to the applicant fail in one or more important respects to meet all of the requirements that are desirable for an ocean wave harnessing system. Probably the single greatest deterrent to the commercial acceptance of prior systems has been their marginal efficiency and their undue complexity which seriously degrades their reliability in the hostile environment of the ocean.

In view of the serious need to develop new energy sources in the face of depleting resources of fossil fuels, advancements in the state-of-the-art over the above described devices are required.

BRIEF SUMMARY OF THE INVENTION

The overall objective of the present invention is to provide a highy practical means for the conversion of wind-induced surface ocean waves into useful power. The basic steps accomplished by the present invention in the desired conversion comprise, (1) concentrating the surface waves, without significant reflection, (2) conversion of the potential energy component to essentially pure kinetic energy pulses, (3) smoothing of the kinetic energy pulses, (4) conversion of the smoothed kinetic energy to rotary shaft power, and (5) dispersal of the system effluent.

The novel structure, of the embodiment of the invention preferred for the open sea, utilizes Fermat's principal for concentrating randomly directed wave energy of variable period into pure kinetic energy which may then be applied directly to a turbine rotor.

Available power input of a typical or average ocean swell for a crest one meter above sea level having a ten second period is 40 kilowatts per meter of shoreline. A wave-concentrating element of the apparatus functions as the analog of an acoustical horn to concentrate the surface waves and cause them to crest and break. This device relies upon refraction phenomena and is capable of essentially capturing all incident wave energy over a broad range of wave periods regardless of the direction of approach. Waves propagated in the open ocean comprise energy which is approximately half potential and half kinetic. The geometry of the wave concentrator causes the wave to break and thereby be transformed into nearly horizontal, pure, kinetic energy, which is then directed radially inward towards a central inlet hub of the apparatus. Inlet guide vanes direct this rush of water tangentially into a central downward passage where it swirls in a vortex. The swirling water vortex functions as a liquid flywheel, the inertial properties of which smooths the pulsating energy, permitting the water to uniformly enter a turbine rotor where continuous rotating shaft power is generated.

After leaving the turbine rotor, the water effluent, still possessing some residual swirl, is discharged through a stationary diffuser into the surrounding ocean. In the diffuser the residual swirl serves to reduce the back pressure at the turbine rotor. The turbine rotor shaft may be used to drive an electrical generator or other utilization device. In a first embodiment, the entire assembly may be constructed to float and be tethered to an offshore mooring. Second and third embodiments comprising near-shore-based structures are also described.

In a typical construction, a device 78 meters in diameter will produce one megawatt of shaft power, rated with waves of one meter half-amplitude and having a period of seven seconds.

It is, therefore, an object of the invention to provide a novel and improved energy conversion system for receiving periodic surface wave energy and generating continuous useful kinetic energy at its output.

Another object of the invention is to provide novel and improved apparatus for the harnessing of ocean surface wave energy.

Still another object of the invention is to provide novel and improved apparatus for capturing and concentrating periodic surface wave energy which is partly potential and partly kinetic and converting it to essentially all-kinetic energy.

Yet another object of the invention is to provide novel and improved means for smoothing pulses of kinetic energy so as to provide continuously-available kinetic energy, by means of the inertial properties of a liquid vortex.

A general object of the invention is to provide a wave motor system which is simpler in structure, more reliable in operation, and substantially more efficient than those heretofore known in the art.

The invention resides partly in the physical and mechanical structures embodied in the refractor/concentrator, pulse smoother, and rotating member and discharge/diffuser components of the system as herein specifically illustrated, but also embraces the concept of the system itself, considered as an integrated whole, and independently of the structural details of its several parts.

Since certain changes may be made in the energy conversion processes and the detailed constructional features of the system components without departing from the scope of the invention herein involved, it is intended that all matter contained in the descriptions of the preferred embodiments which follow or as shown in the accompanying drawings shall be considered as illustrative and not in a limiting sense.

DESCRIPTION OF THE PREFERRED EMBODIMENTS

Figure 1:
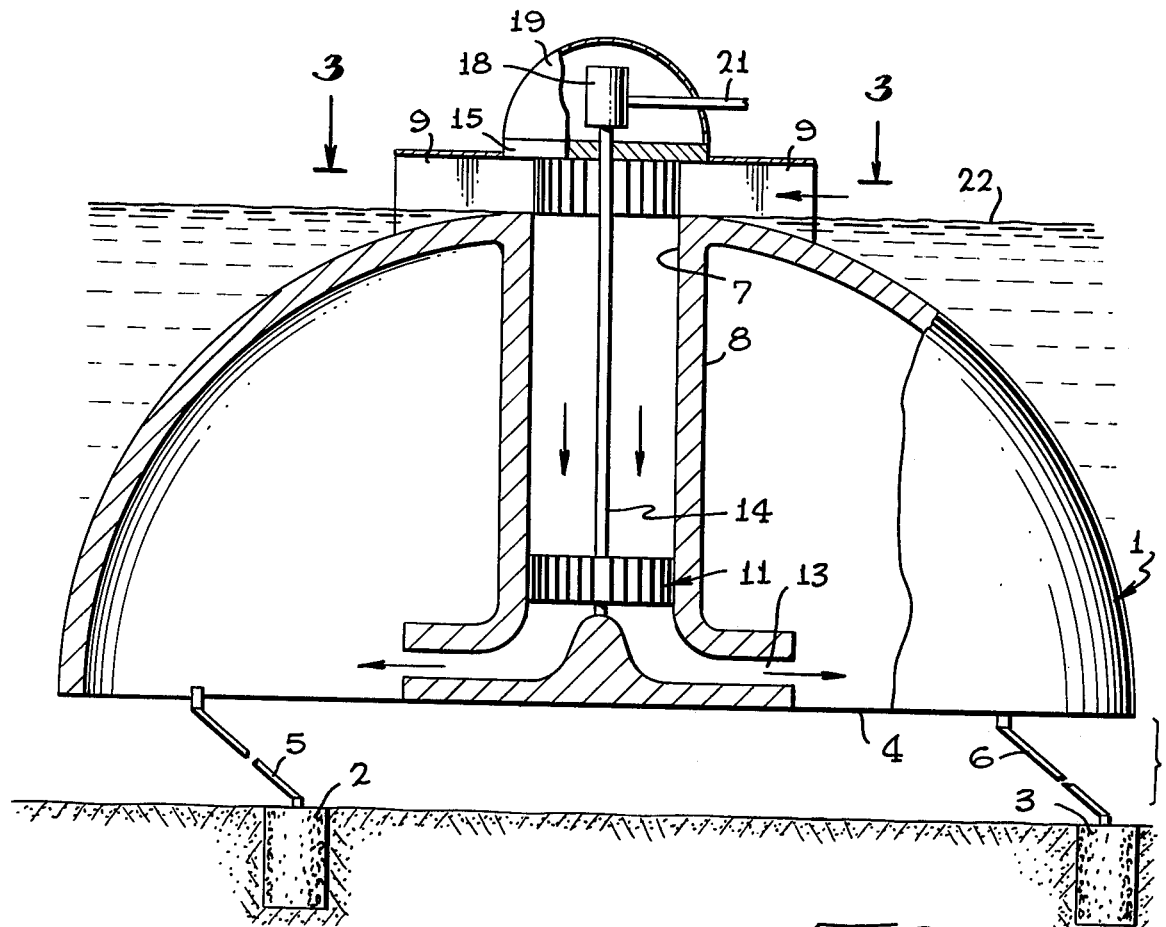
FIG. 1 is a somewhat diagramatic cross-section of a floating wave powered motor constructed in accordance with a first embodiment of the invention.

Referring to FIG. 1 there is shown a wave powered motor constructed in accordance with the present invention having a nearly hemispherically shaped member, or shell 1, which comprises the major structural element of the apparatus. The shell 1 may be fabricated from reinforced concrete, or steel, or other suitable material. The geometry of the shell will be described in greater detail hereinafter in connection with FIGS. 2, 3, 4, 5, and 6. A three-point anchorage comprising mooring blocks secured to the ocean floor and articulated linkages extending therefrom, is provided for holding the apparatus in place. Two of the mooring blocks are shown at 2 and 3, and may comprise caisson-cast concrete piers. In lieu of the articulated linkages, (5,6) cables, or other suitable elements may be used to connect the skirt 4 or lower edge of the shell 1 to the anchorage (2-3).

The upper central part of the shell is provided with a circular inlet 7. Depending from the circular inlet 7 is a hollow cylindrical standpipe 8 having a vertical height approximately equivalent to the height of the shell 1. Stationery inlet guide vanes 9 are secured to the shell and extend radially outward from the upper end of the standpipe 8, to the region of breaker formation and function to impart a rotational moment or swirl to water entering the standpipe 8 via inlet 7. A turbine 11 is mounted near the lower end of the standpipe 8. The swirling water in the mid-portion of the standpipe 11 comprises a fluid flywheel which imparts an angular torque to the turbine rotor 11. Water exiting from the turbine 11 passes through a diffuser 13 fixedly secured to the lower terminus of the standpipe 8.

A rotating shaft 14 extends upward from the turbine 11 to a centerbody 15 secured to the upper central portion of the shell 1 above the inlet 7. The centerbody 15 provides support for the top edges of the inlet guide vanes 9. An electrical generator 18, or other utilization device, is rotatably coupled to the upper end of the turbine shaft 14. A suitable protective cover 19 may enclose the upper portion of the centerbody 15. A waterproof conduit or cable 21 connects the electrical generator to a suitable power distribution system which may, for example, be located on shore. The neutral water level (viz., in the absence of wave action) is indicated at 22 in FIG. 1. The location of the neutral water level is not critical. It has been found that the device operates satisfactorily with the water level above or below the level shown. This means that the device may be mounted solidly in shallow water in spite of the tides.

Five separate steps are necessary for the utilization of the propagated surface wave energy. The first is the collection of energy from a considerable length of the available wavefront. For example, a concentrating device which serves 100 meters of wavefront can collect up to 4 megawatts of power from typical ocean swell having a half amplitude of one meter and a period of ten seconds. The critical requirement for the interface with the wavefront is the transmission of the wave energy across the interface rather than its reflection. Because the energy is in the form of a propagating oscillatory wave, whether or not the energy reflects is governed by whether an impedance match or an impedance mismatch exists at the interface. The invention makes use of a structure which is the surface wave equivalent of an acoustical horn to collect and concentrate the propagated surface wave energy. For any given wave of a maximum period (T), a horn shape may be generated to provide a suitable impedance match between the mouth and the throat of the horn. The outer surface shape of the shell 1 comprises the impedance transformer which may be considered as analogous to an acoustical horn. This may be visualized by considering the cross-sectional shape bounded by the neutral water level 22 and a radial section through the shell 1. Inasmuch as this shape extends through a full revolution, the actual structure is dome-shaped and functionally and physically resembles a natural circular atoll.

The oscillatory waves propagating within the "horn" consist of about ½ kinetic energy (of circular rotation) and about ½ potential energy (of elevation or depression). If these waves now encounter a sloping ramp, such as that provided by the central outer surface of the shell 1, they will crest and break. The breaking wave is now called a great primary wave of translation. All parts of the wave move horizontally in unison and the energy is mostly kinetic. The region in which this occurs is called the surf zone. Thus, the horn/ramp combination provided by the shell 1 accepts oscillatory waves and delivers massive pulses of pure kinetic energy to the inlet of the shell.

Figure 2:
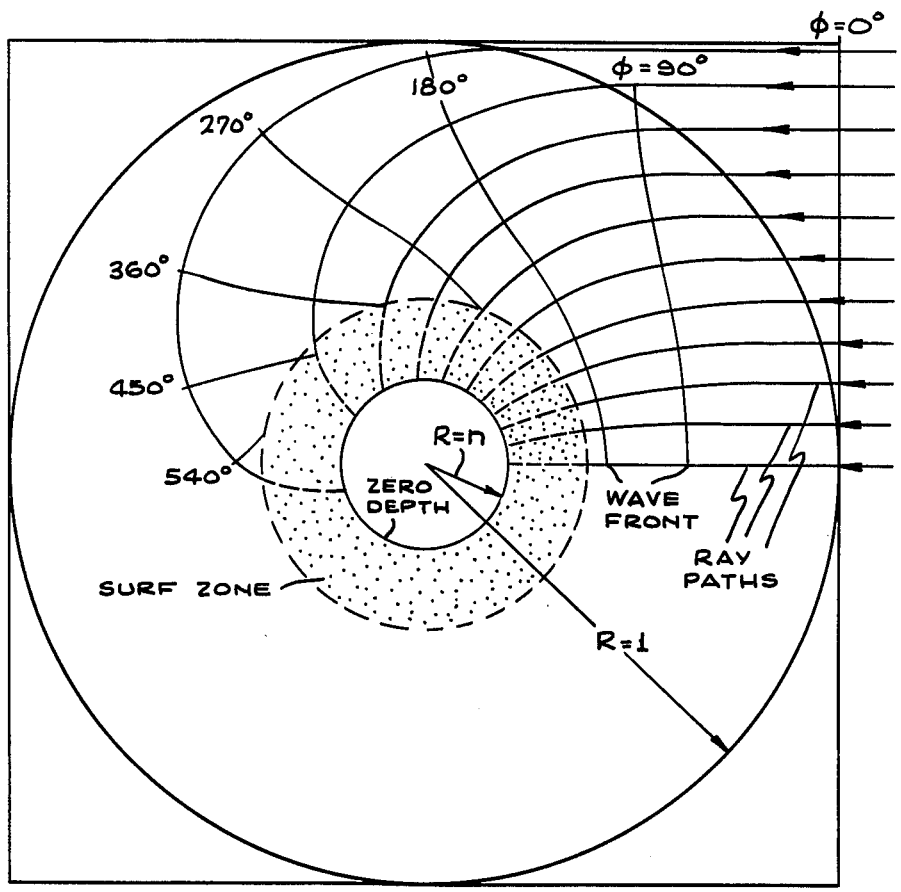
FIG. 2 is a chart displaying ray paths and wave fronts impinging upon an atoll, which chart is useful in the exposition of the invention.

There is shown in FIG. 2 a graphic representation of ray paths and wavefronts impinging on an atoll-shaped horn/ramp, of the type comprising the shell 1 in FIG. 1. As can be seen, the linear wavefront entering from the upper right quadrant is progressively refracted as it encounters the varying bottom contour (viz., the contour of the top of the shell). The effect is to wrap the wavefront around the atoll in a spiral which tends to converge on the center of the atoll.

The velocity of surface waves varies inversely with the local depth. As a result, surface waves refract, which means that their direction of propagation always bends strongly towards shallower water. An appropriate shell contour can completely capture an approaching wavefront as large as its own diameter, and convert this entire wavefront into a cresting wave extending all the way around the shell. Thus, the shell accomplishes both the concentrating function and the wave-breaking function as well, and may be aptly described as a refractive horn.

There is some inherent smoothing of the input pulse by the geometry of the device. Each portion of the approaching wavefront travels a different trajectory and arrives on a different part of the shell at a different time. The phase angle $\phi$ is shown in FIG. 2. The wave may be thought of as wrapping itself around the shell. The result is a relatively steady delivery of energy to the inlet, and a substantial reduction in the required volume for the liquid flywheel. The flywheel comprises the water contained in the standpipe. This natural smoothing of the wave impulses into a quasi-steady power delivery is an important feature of the invention.

Since the impulse kinetic energy is not suitable for the generation of constant shaft power, some form of inertial smoothing is required. Typically, the input energy pulses are 5 to 10 seconds apart. The inertia of water itself can provide a flywheel effect capable of smoothing the pulse input. The pulses of water are directed tangentially into a container large enough to accept the entire pulse. Thus, the periodic pulse inputs sustain a vortex motion in the container and the kinetic impulse is stored in the angular momentum of the entire volume, for continuous gradual withdrawal.

The conversion of the energy stored in the liquid flywheel to rotary shaft power is accomplished by a turbine wheel coaxial with the vortex.

The predominently kinetic great primary waves of translation flow radially inward. This is converted into tangential flow into the central container (standpipe) 8 by a turning vane assembly 9. An axial flow turbine wheel 11 is disposed coaxially below the turning vanes 9 at the lower end of the standpipe 8. The turbine wheel 11 is so designed that not quite all of the energy of the swirling water is extracted. The small residual amount of the swirl is left to activate the discharge diffuser 13.

The discharge diffuser 13 is vaneless and extends radially outward from the bottom of the standpipe 8. Residual swirl in either direction induces a radial outflow and the slowing flow creates a reduced pressure at the bottom of the standpipe 8. Thus, the diffuser 13 actually tends to pump the standpipe 8 and lower the water level therein. System optimization exists when the standpipe level is depressed just enough to fully accept the inflow volume. With this arrangement, the lip level at the top of the standpipe may be placed just at the neutral level 22 of the ocean surface. Any small inward spillage is inconsequential. As previously mentioned, within limits, the system is quite insensitive to the actual location of the neutral level.

There is an optimal size for the refractive horn. The shell 1 comprising the refractive horn is a roughly hemispherical structure, which means its surface area is proportional to the square of its radius ($r^2_o$). It is capable of capturing the energy content of a length of wavefront equal to its major diameter ($2r_o$). It thus requires only half the material to build two smaller units rather than one larger unit of the same capacity. The optimum size is, therefore, the smallest which provides satisfactory concentration and phase distribution for the band of wavelengths it is to absorb.

To accomplish the complete capture of one diameter of wavefront at the design wavelength $\lambda_o$ and at $\lambda' = 2\lambda_o$, and also to capture about 80% of a wavefront at $\lambda = 0.5\lambda_o$, and to retain a good phase distribution around the unit, the diameter should be one design (deep water) wavelength.

The mode center period for the statistical population of the surface waves is about $T = 7.07$ second. The corresponding deep water wavelength ($\lambda_o$) is 78 meters. The optimum radius is thus taken to be 39 meters.

In a preferred embodiment the optimum contour of the shell 1 is designed such that:

$$(C/C_o) = \sqrt{R^2 - n^2}$$

and the actual depth d as a function of normalized radius ($r/r_o = R$) is:

$$d = (\lambda_o/2\pi)(C/C_o) \operatorname{arctanh}(C/C_o)$$

or since $\lambda_o = 2r_o$ $$(d/r_o) = (1/\pi)(C/C_o) \operatorname{arctanh}(C/C_o)$$

where C = wave velocity at depth d
$C_o$ = deep water wave velocity
$R = (r/r_o)$
n = value of R where d = 0

It is preferred that the standpipe 8 be sized to accept the total volume flow expected without requiring the flow to accelerate. The great waves of translation approach the standpipe with a horizontal velocity:

$$v = \sqrt{g \cdot \text{height}}$$

where v = translational velocity
g = acceleration due to gravity
Their height at that instant is greater than their original deep water height (a) for two reasons. Their height is augmented by a factor up to 1.6 by a wave concentration effect of the refraction. The wave amplitude is also increased by a factor of about 2.5 as the water becomes shallower. Thus, the wave height at the inlet may be 4a and its translational velocity will be:

$$v = 2\sqrt{g \, a}$$

where a = deep water wave half amplitude
If the area of the standpipe inlet equals the wave height times the perimeter, the water will not be accelerated.

$$(4a)(2\pi n \, r_o) = \pi n^2 r_o^2$$

$$8a = n \, r_o$$

$$n = (8a/r_o)$$

If a = 1 meter and $r_o = 39$ meters $$n = 8/39 \simeq 0.2$$

In a construction of the invention in which the intercepted wavefront is 78 meters, the gross power transported in the wavefront for (a)=1 meter, T=7.07 seconds is:

power/unit length=$(\rho/4)(g^2/2\pi)a^2T$

Total power=$78\times 4\times 7.07\times 10^{10}$ erg/sec.
 =$2.2\times 10^6$ watt
 =2.2 megawatt At an efficiency of 45%, the nominal rating for this size of a wave motor constructed in accordance with the invention, is one megawatt of shaft power.

Since very substantial volumes of water are handled, this volume must finally be returned to the ocean and carry away with it as little energy as possible. To minimize this dumping loss the final velocity must be small, and the area of final egress large as compared to the discharge entrance area. This function is provided by a diffuser at the lower end of the standpipe.

In summary, with the above-described five steps, the wavefront is accepted and concentrated by the refractive horn/ramp shaped shell, crested into a kinetic pulse by the ramp portion, the pulse is temporarily stored by the liquid flywheel as angular momentum (still kinetic) and the momentum gradually converted to steady rotary shaft power (kinetic) leaving just enough energy in the discharge flow to move the flow volume steadily and almost imperceptibly across a large final discharge area.

The theory governing the refractive ray paths shown in FIG. 2 is valid only where the depth d is greater than about one wave-height (a); at this depth the oscillatory wave abruptly becomes a breaker. The trajectory of the breakers is governed by complex hydrodynamic considerations and the breakers no longer refract towards the center. Thus, from the edge of the surf zone inward, it is necessary to direct the breakers by means of guide vanes.

The choice of guide vane shape can depend on the installation site of the wave motor. In the open sea waves may approach from any direction and in fact normally approach from several directions at once. The guide vane assembly should, therefore, be axisymmetric in order that the wave motor be omnidirectional.

Installation sites closer to shore are likely to receive waves predominately from a single general direction. In such a case, the guide vanes need not be axisymmetrically dispersed. Some increase in efficiency occurs if their outer portions are shaped to conform generally to the ray paths.

Figure 3:
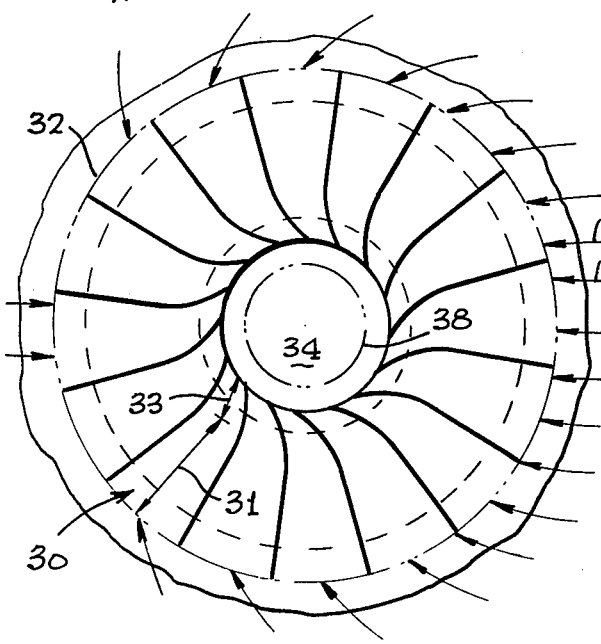
FIG. 3 is a plan view of symmetrical inlet guide vanes taken along line 3—3 of FIG. 1.

FIG. 3 is a diagramatic plan view of an inlet guide vane assembly intended for use in the open sea. A typical waveguide 30 has an outer portion 31 extending radially to the edge of the surf zone 32. Its inner portion 33 is shaped to direct flow tangentially into the fluid flywheel 34. Arrows 35, 36, and 37 indicate typical ray paths due to refraction up to the edge of the surf zone.

Figure 4:
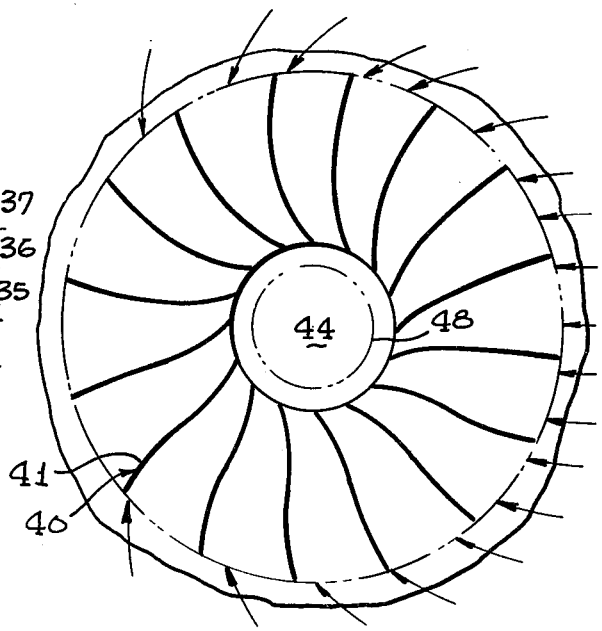
FIG. 4 is a plan view of individually shaped inlet guide vanes taken along line 3—3 of FIG. 1.

FIG. 4 is a diagramatic plan view of an inlet guide vane assembly intended for use in a close to shore installation. In this case, the outer part 41 of each guide vane 40 is contoured to conform approximately to a nearby ray path. This can result in some increase in overall efficiency due to reduced turbulence. The inner portion of the waveguides 40 directs the flow tangentially into the fluid flywheel 44 exactly as in the case of FIG. 3.

There is an optimum shape for the inner portion of the inlet vanes 30 or 40 that drive the liquid flywheel. The vanes should direct the incoming water tangentially at the radius of gyration 38 or 48 of the cylinder of fluid. This is located at 0.707 times the outer radius of the cylinder. Assuming rigid body rotation of the cylinder of water that constitutes the liquid flywheel, there is no relative motion between the injected water and the flywheel water, i.e., minimal turbulent losses at the radius of gyration. Angular momentum transport in, equals angular momentum transport out. If the driving point radius is larger, then the inner water must accelerate and rotate faster to conserve angular momentum. This is undesirable because it contributes to turbulent losses and the radial distribution of angular velocity makes turbine wheel design more difficult. If the radial point at which the flow enters is at a radius less than the radius of gyration then the water at a greater radius must decelerate. This also causes turbulence and turbine wheel design complexities.

Figure 5:
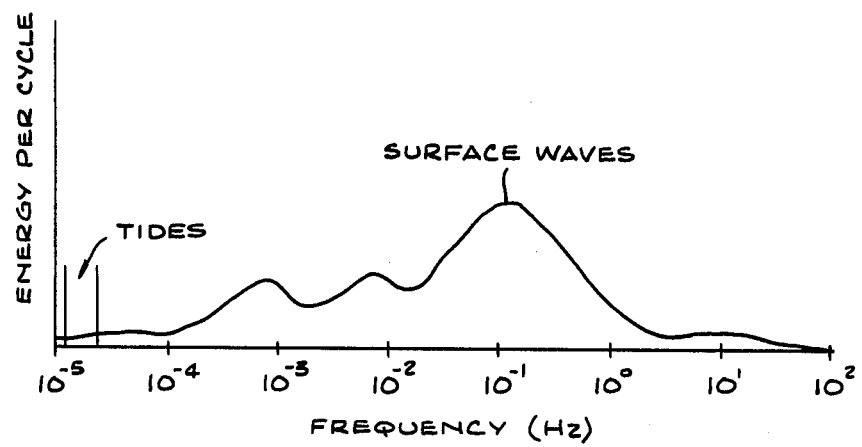
FIG. 5 is a chart which illustrates a typical power spectrum of ocean waves, and swell.

FIG. 5 shows a typical power spectrum for wave energy in the oceans plotted vs. wave frequency F. The actual wave energy distribution depends somewhat on geographic location. For example, very long period waves are more prevalent in Antartica than in most other places. FIG. 5 shows a major concentration of energy in a broad peak centering near $(1/F)T=7$ seconds. The range of periods 5 sec to 10 sec encompasses much of this energy concentration which suggests the selection of a seven second period as an average design point.

Figure 6:
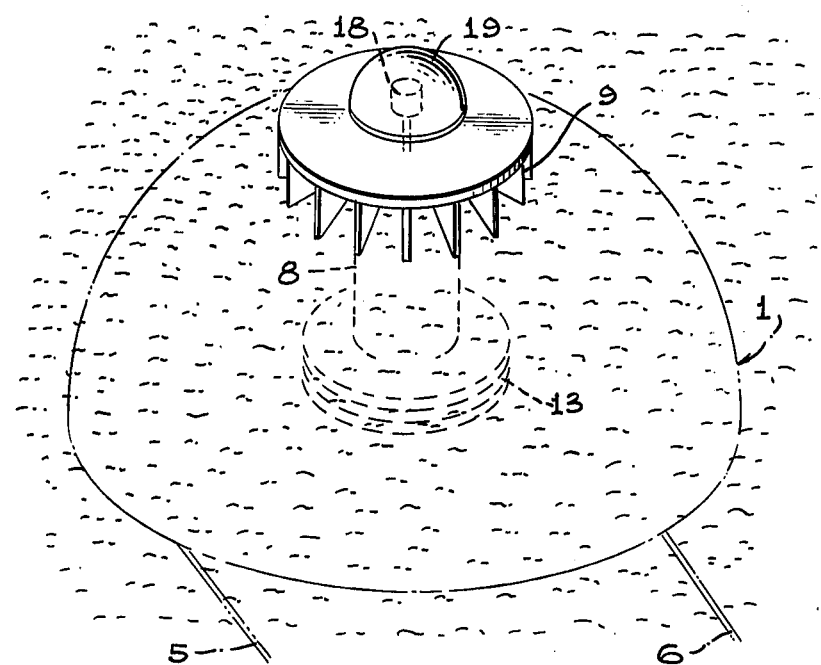
FIG. 6 is a perspective view of the invention installed in its operating environment.

FIG. 6 shows the first embodiment of the invention in its operating environment. Note that it is almost completely submerged. Only the guide vanes and the small dome housing the load device protrude out of the water. A major problem in the design of wave energy extraction machines in the past has been the inevitability of occasional violent storms. It has often been proposed that such apparatus be deliberately sunk in anticipation of a storm to protect it from damage. In the case of the present invention nearly all of the structure is already fully submerged. The inlet to the fluid flywheel has finite fluid passing capacity which will protect internal parts such as the turbine against overload. The remaining small superstructure can be designed to withstand the passage of giant waves completely over it.

Figure 7:
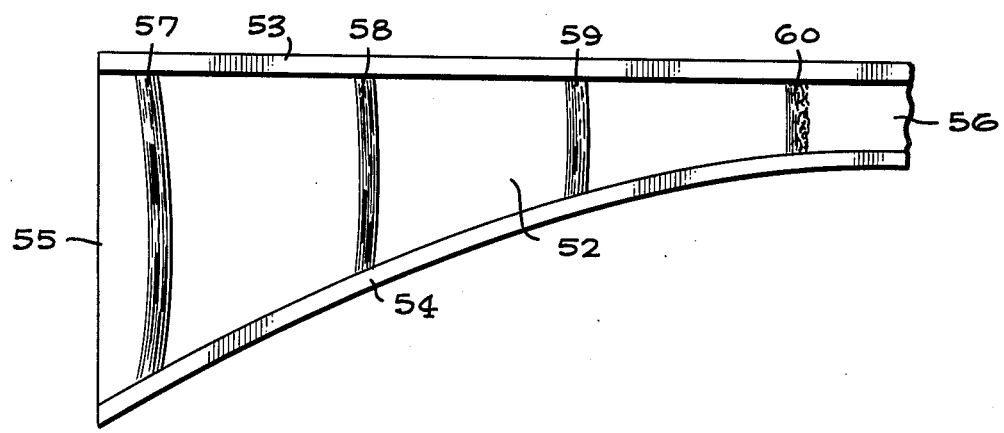
FIG. 7 is a diagramatic plan view of the wave-concentrator horn portion of a second embodiment of the invention showing the concentration of the ocean surface waves and their transformation to breakers.

There is shown in FIG. 7 a portion of an alternate embodiment of the invention in which the wave concentrator comprises a horn structure. The entire horn device may be supported from the ocean floor in relatively shallow water or it may float. The horn comprises a pair of confronting wall members 53 and 54, spaced apart at a first end comprising the mouth 55, and converging at the other end to a throat region 56. The flare may follow any suitable curve that meets a criterion for non-reflection to be described later. The crests of the incoming ocean surface waves are indicated at 57 through 60.

Figure 8:
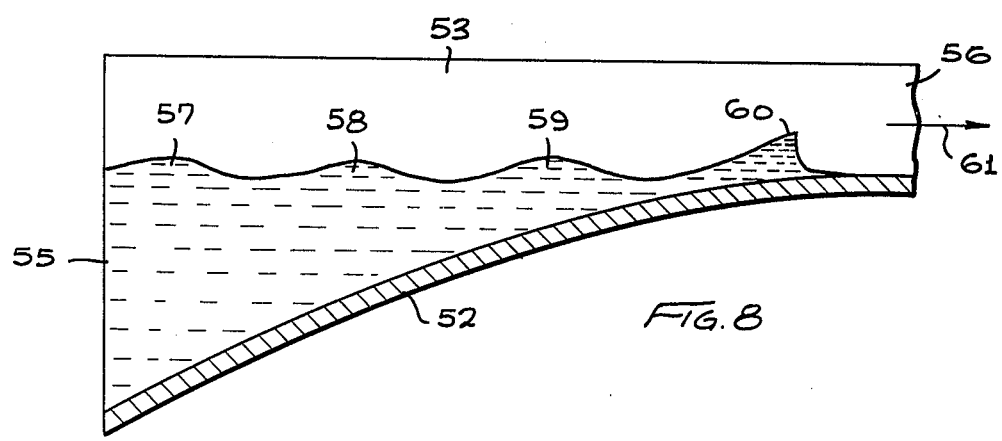
FIG. 8 is a diagramatic elevation view of the apparatus of FIG. 7.

The apparatus of FIG. 7 is shown in diagrammatic cross-sectional elevation in FIG. 8. As can be seen, the wavecrests, 57 through 60, have increasing amplitude in the direction of propagation, 61, from the mouth, 55, towards the throat, 56.

The floor of the apparatus shown in FIGS. 7 and 8 has a ramp contour, which causes the propagated surface waves to crest and break. As can best be seen in FIG. 8, the floor 52 follows a smooth curve, progressing from the mouth 55 to the throat 56 in the direction of arrow 61. The wavecrests 57 through 60 decelerate progressively until they abruptly break as indicated at 60.

Figure 9:
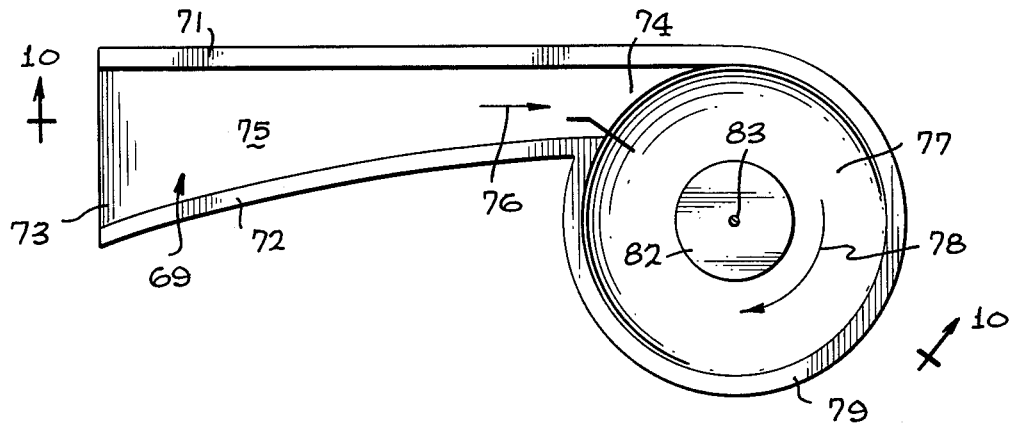
FIG. 9 is a diagramatic top plan view of the second embodiment of the invention showing a horn and ramp connected tangentially to a basin which contains the liquid flywheel.
Figure 10:
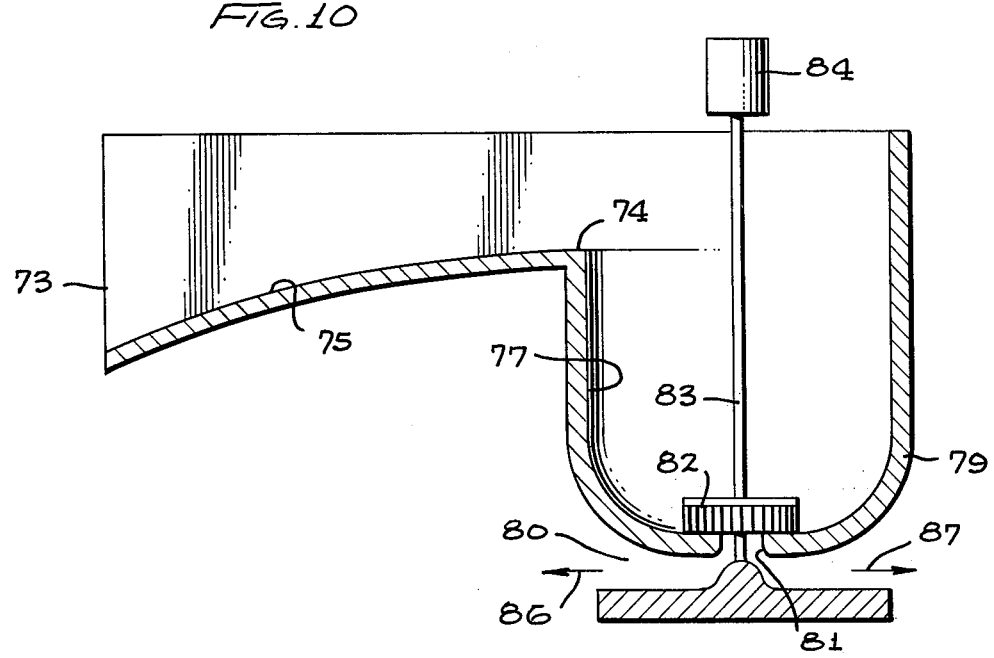
FIG. 10 is a diagramatic elevation cross-section view of the apparatus of FIG. 9 taken along line 10—10 of FIG. 9.

There is shown in FIG. 9, a top plan view of a second embodiment of a wave motor constructed in accordance with the invention which incorporates a wave-concentrator horn of the type shown in FIGS. 7 and 8. The horn portion 69 is defined by wall members 71 and 72 which converge from the mouth portion 73 towards the throat portion 74. The depth of the horn 69 may be uniform up to the leading edge of the ramp portion 75. Ramp portion 75 becomes progressively shallower in the direction of arrow 76. Cresting of the surface waves occurs in the shallow ramp portion of the wave concentrator. The cresting and breaking waves enter the basin 77 tangentially in the direction of arrow 78, resulting in a vortex in the basin. Referring to FIG. 10, it can be seen that the basin is defined by wall member 79. A discharge diffuser 80 is located below the center of the bottom of the basin and provided with an inlet 81. Centered above the diffuser inlet 81 is a water turbine wheel 82. The water turbine wheel 82 is suitably mounted for rotation of shaft 83. An electrical generator or other load device 84 is connected to the upper end of shaft 83. Water passing through the water turbine wheel 82 and discharge diffuser 80 is returned to the ocean in the direction of arrow 86 and 87.

The load device 84 may be a water pump or other utilization device, in lieu of an electrical generator. Various means may be employed for the delivery of the generated power from the generator to the shore. In addition to the electrical power generation technique described herein above, another alternative is the generation of hydrogen and oxygen gas by electrolysis of sea water. The generated gases are piped ashore.

Figure 11:
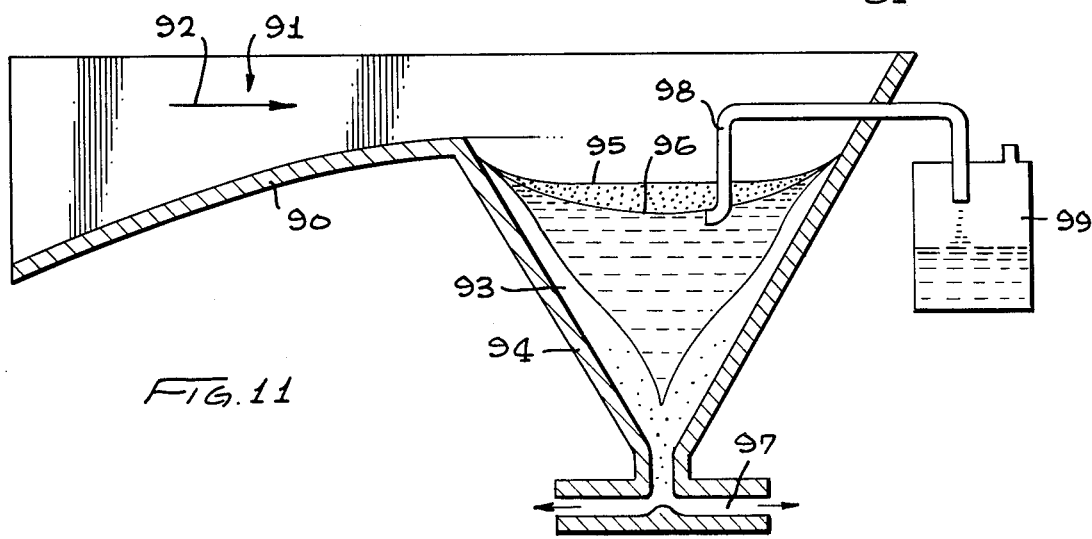
FIG. 11 is a diagramatic cross-section view in elevation illustrating a modification of the invention adapted to skim oil from the ocean's surface.

There is shown in FIG. 11 a modification of the apparatus of FIG. 10 wherein the basin portion is adapted to skim oil from the ocean surface. In this construction the ramp 90 and horn 91 supply incoming pulses of substantially pure kinetic energy in the direction of arrow 92 to the conically shaped basin 93 defined by wall member 94. Because of the conical shape, the conservation of angular momentum requires that the rotational velocity increases as the fluids move downward. The swirling water or vortex within the basin 93 will have a depressed upper surface 95. Oil 96 separated centrifugally from the water will float on the depressed upper surface of the swirling water in the basin 93. The sea water will be discharged from the bottom of the basin 93, through discharge diffuser 97. A ram scoop terminated pipe 98 has its inlet located within the basin 93 in the upper portion of the vortex occupied by the surface oil. The oil collected by the ram scoop and pipe 98 may then be discharged into a suitable container 99. The entire apparatus of FIG. 11 may be made mobile by incorporating its essential elements into a special ship. Such a ship, may then pursue an oil slick and recover the oil into storage tanks.

Figure 12:
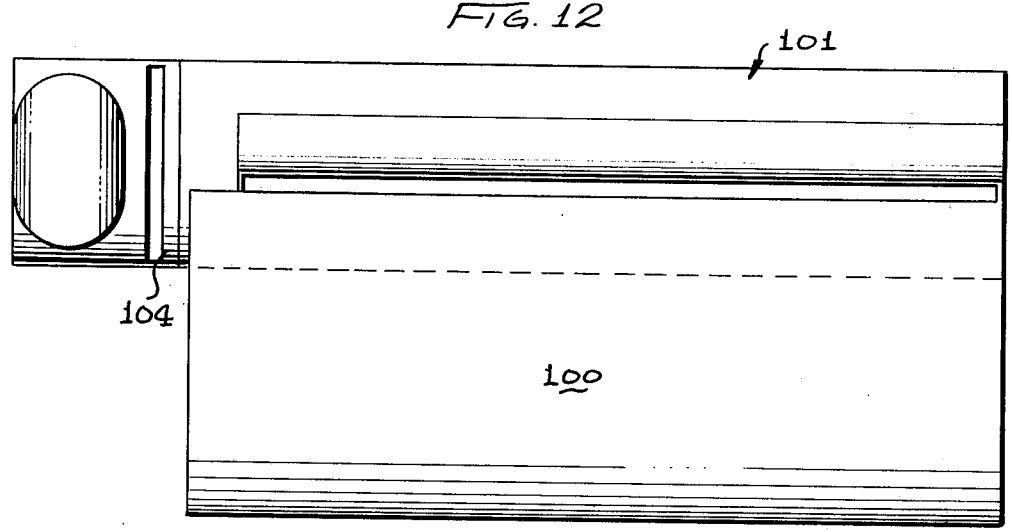
FIG. 12 is a plan view of the apparatus of FIGS. 13 and 14.
Figure 13:
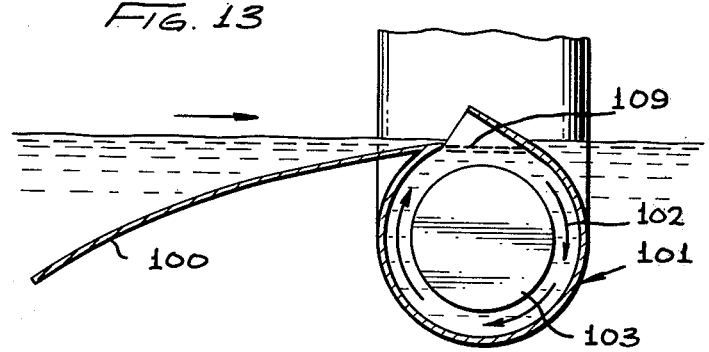
FIG. 13 is a diagramatic cross-section view, in elevation, illustrating a third embodiment of the invention.
Figure 14:
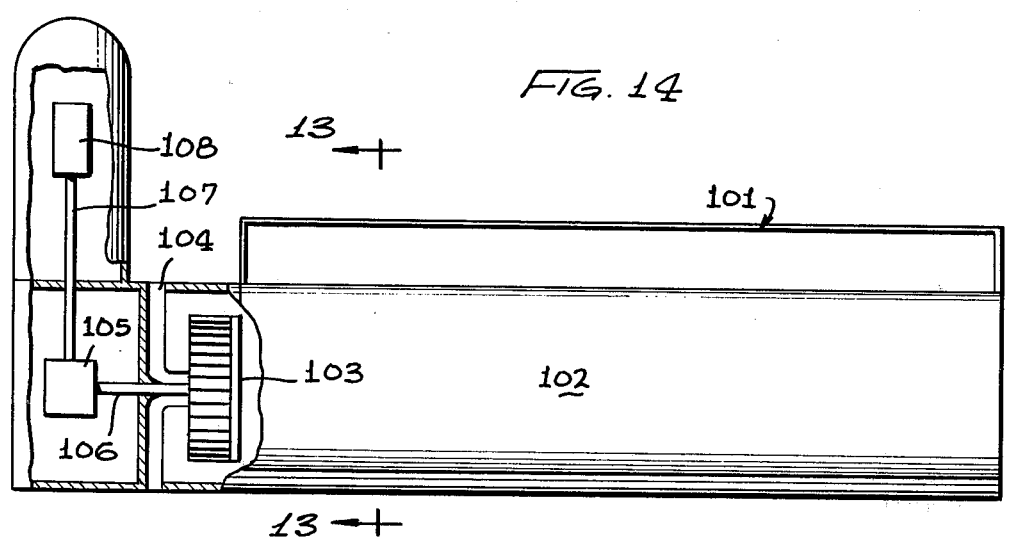
FIG. 14 is an elevation view, partially broken away, of the apparatus of FIGS. 12 and 13.

A third embodiment of the essential features of the invention is shown in plan view in FIG. 12, in transverse section in FIG. 13 and in longitudinal section in FIG. 14. This embodiment is particularly well suited for installation close to the shore in quite shallow water. To fully understand its operation, it is helpful to recall that a gradually sloping sea bottom is a refractive structure. The more or less randomly directed waves of the open sea that impinge on such a gradual slope are refracted such that they approach the shoreline with ray paths that are nearly perpendicular to the shore regardless of their original direction. This natural sea bottom shape is in effect a part of the system, which serves to order the waves into a controlled and predictable direction of approach. In many localities natural concentration effects occur due to the details of shoreline and sea bottom contours which provide particularly suitable locations for wave-powered motors.

In such a case, the final concentration of the wave energy need only be accomplished in the vertical direction by means of a shaped ramp which meets the criterion for non-reflection to be described later. In FIG. 12 the cylindrical vessel 101 containing the fluid flywheel extends horizontally, essentially parallel, to the shoreline and wavefronts. The ramp 100 extends for essentially the full length of the cylinder and directs the breakers tangentially into the fluid flywheel at the top. The rotating cylinder of water migrates horizontally toward the turbine wheel at one end of the cylindrical vessel 101. The effluent from the turbine wheel passes through a radial diffuser 104, thus returning water to the sea with a low terminal velocity.

FIG. 13 shows a transverse cross-section of the third embodiment. The ramp 100 guides the breaker tangentially into the fluid flywheel 102. The horizontal flywheel has a somewhat variable flat spot 109 at the top because of the fluctuating volume of water in the horizontal cylinder 101, however, angular momentum is still preserved.

FIG. 14 is a longitudinal cross-sectional elevation of the third embodiment. It shows a turbine 103 of the radial inflow type and the use of a radial diffuser 104. The turbine drives the right angle gear box 105 by means of shaft 106. The second shaft 107 connects the gear box to a load device 108.

All of the described embodiments utilize horn-like means to concentrate the wave energy before it enters the fluid flywheel as a great wave of translation. The initially described embodiment utilizes a contoured dome which compresses the energy vertically by its progressively shallower shape and guides the waves by refraction in lieu of horn side walls. The second embodiment utilizes both a contoured floor to compress the waves vertically and side walls to compress the wave front horizontally. The third embodiment utilizes a shaped ramp to compress the energy vertically only, since it is presumed that the waves have already been conditioned to some extent by natural refractive formations.

In all cases, it is important that the wave energy concentrating and transmitting structure function without reflecting significant amounts of energy since any reflected energy can never reach the turbine wheel. Prevention of reflection is equivalent to attaining an impedance match between the wavefront and the entrance mouth of the horn-like concentrator. Since in all cases the throat region connects to an energy absorptive termination (the fluid flywheel), the crucial factor determining the existence of non-reflective impedance match or a reflective mismatch is the effective cutoff frequency of the horn-like structure, as will be developed more fully below. Myriad design variations are possible. For example, many dome contours will provide suitable refractive patterns. The same degree of variability prevails for the horns and ramps of the first and third embodiments.

It has been found desirable to derive a simple criterion for screening all such designs to predetermine whether or not the highest cutoff frequency along a horn axis could produce an impedance mismatch and thereby reflection of energy. This criterion is briefly derived below and a simple example of its application is presented.

Attention is directed first to the well known exponential acoustical horn (actually a special case of a somewhat larger family of horns known as hyperbolic horns). The exponential horn is defined as having a cross-sectional area S which grows axially from a throat area $S_o$ in accordance with the following law:

$$S = S_o \exp 2 k_c x$$

where x is the distance from the throat and $k_c$ is called the flare constant or wave number at cutoff.

$k_c$ may be variously written as $$k_c = (2\pi f_c/c) = (2\pi/\lambda_c)$$

where $f_c$ is called a cutoff frequency and $\lambda_c$ is the wavelength at the cutoff frequency and c is the velocity of sound. Any frequency greater than the cutoff frequency may propagate as plane waves along the axis of the horn. Any frequency below the cutoff frequency cannot propagate in the horn and is instead reflected from the mouth of the horn.

The cutoff wave number $k_c$ may be written in yet another useful way. By taking the first derivative of the area S with respect to axial position x we obtain $$S' = 2k_c S_o \exp 2k_c x$$

from which it follows that $$2k_c = (S'/S)(f=f_c)$$

and hence $$f_c = (c/4\pi)(S'/S)$$

Because the underlying wave equations which govern acoustical waves and surface waves (as well as electromagnetic and other waves) are mathematically identical in form, horns may be analogously used and analyzed in all such fields. There exists, however, one complication. The velocity of sound waves and electromagnetic waves are independent of their frequency (nondispersive waves) whereas the velocity of surface waves depends on both the frequency and the depth of the water (dispersive waves). Given an arbitrary horn like shape we select the coordinate origin x=0 at the depth where the waves break. This occurs approximately where the depth equals one typical wave amplitude. The cross-sectional area bounded by the neutral water surface, the ramp and real or assumed side walls at x=0 is taken to be $S_o$. In a similar way S may be calculated or measured at any other location x. Finally, $S'$ may be approximated at any point as $$S' \cong (S_2 - S_1)/(X_2 - X_1)$$

where $S_2$ is the area at $x_2$ and $S_1$ the area at $x_1$ where $x_2$ and $x_1$ are neighboring points near X.

The arbitrary horn contour between $x_2$ and $x_1$ may be regarded as a short segment of an exponential horn having the same areas $S_2$ and $S_1$, the same distance from the origin x and the same throat area $S_o$. Its flare constant is $k_c$ (a function of x) and the cutoff frequency for the short segment $x_2 - x_1$ is approximately $$f_c = (c/4\pi)(S'/S)$$

In this expression, the wave is dispersive. The wave velocity c may be determined from the expression $$c = (g/2\pi f_c) \tan h \, (2\pi d f_c/c)$$

where g=acceleration of gravity, d=local depth. However, for most cases of interest, reflections due to excessive $f_c$ are most likely in shallow places. For shallow water there is an approximate value for wave velocity $$c = \sqrt{gd}$$

Finally, $$f_c = (c/4\pi)(S'/S)$$

$$f_c = (\sqrt{gd}/4\pi)(S'/S)$$

A simple example will serve to illustrate the application of this criterion to assure the selection of a non-reflective wave concentrating horn. Suppose a straight uncontoured ramp is being considered for the third embodiment and the horn is required to be non-reflective to waves having a 10 second period (f=0.1 Hz). For a conservative design set $f_c$ an octave lower i.e., $f_c = 0.05$ Hz.

Since the third embodiment utilizes only the ramp we may assume the horn width is constant and $$S/S_o = d/d_o$$

where $d_o$=the depth of the water where breaking is expected, i.e., at a depth equal to one design waveheight (a) which we assume is one meter. Then for a straight ramp $$d = mx + a$$

where m is the slope of the ramp.

$$f_c = (\sqrt{gd}/4\pi)(S'/S)$$

$$f_c = \frac{\sqrt{g(mx+a)}}{4\pi} \frac{m}{m+a}$$

$$f_c = \frac{1}{4} \frac{m}{\sqrt{mx+a}}$$

Clearly the maximum value of $f_c$ will occur at x=0 and since a=1 meter $$f_c = m/4$$

$$m = 4(0.05) = 0.2$$

Thus, to meet the preselected criterion the slope cannot exceed 0.2. This corresponds to a slope of 12 degrees to the horizontal.

The existence of this widely applicable criterion makes it possible to classify any horn-like structure as either non-reflective or quite reflective for any chosen design frequency range and the term non-reflective is as a practical matter nearly equivalent to impedance matched. For the purposes of this specification, the terms non-reflective or impedance matched horn can be taken to mean one that meets the criterion just developed.

It is important to note that the horn throat has always been taken to be the location where the wave is expected to break. The act of breaking means an abrupt transition from oscillatory wave behavior governed approximately by the wave equation to a great primary wave of translation. The translational breaker represents a very complex nonlinear state of affairs not subject at all to the wave equation and is governed more by particle kinetics and hydrodynamics. As a result of this abrupt transition from propagating waves to surf, the refraction calculations are only valid to near the beginning of the surf zone. Beyond this point, the surf should be guided by the inlet guide vanes. Similarly, the horn cutoff criterion is applied only to the propagating wave region outside the surf zone and has no meaning in the surf.

The description of the third embodiment, which uses only a shaped ramp, describes the ramp as concentrating the energy in the vertical direction. This may require some clarification. The widely used term "surface wave" is something of a misnomer. Both the pressure disturbances and the circular orbiting particle velocities associated with the sinusoidally disturbed surface persist with exponentially decreasing amplitude to great depths. To account for all of the power transmitted by such a wave it is necessary to integrate the product of the cyclic pressure and particle velocity, ideally to infinite depth. Thus, in a very real sense, an upward sloping ramp which does not reflect energy serves to compress the energy flux into a smaller cross-sectional area and there is a corresponding increase in the height of the waves. Energy compression from a wide wavefront into a narrower wavefront in a horizontal direction is more self evident. It too is accompanied by an appropriate increase of wave amplitude.

From the foregoing, it will be seen that there exists a number of applications for the novel apparatus of the invention. While there have been shown and described and pointed out the fundamental novel features of the invention as applied to preferred embodiments, it will be understood that various omissions and substitutions and changes in the forms and details of the devices illustrated, and in their operation may be made by those skilled in the art. It is intended that the invention be limited only as indicated by the scope of the following claims.

What is claimed is:

1. A wave motor comprising:
   impedance transformation means for receiving surface waves which are at least partly comprised of potential energy, and for converting said potential energy to kinetic energy;
   inertial means having an input coupled to said impedance transformation means for receiving and temporarily storing said kinetic energy, and having an output from which continuous gradual withdrawal of said kinetic energy is obtained; and,
   diffuser means for discharging the medium in which said surface waves are propagated, after having passed through said apparatus.

2. A wave motor as defined in claim 1 wherein said impedance transformation means comprises:
   a refractive horn having a substantially non-reflective flare.

3. A wave motor as defined in claim 1 wherein said impedance transformation means comprises:
   an upwardly convex shell member having its central axis vertically disposed and having a first opening at its apex and a second opening at its base.

4. A wave motor as defined in claim 1 wherein said inertial means comprises:
   a hollow circular container having an inlet tangentially disposed and coupled to said impedance transformation means so as to impart a vortex motion to the input thereto.

5. A wave motor as defined in claim 1 wherein said diffuser means comprises:
   an exit duct of increasing cross-section axially disposed with respect to the output of said inertial means.

6. A wave motor as defined in claim 1 wherein said diffuser means comprises:
   an exit duct of increasing cross-section radially disposed with respect to the output of said inertial means.

7. A wave motor as defined in claim 1 including:
   kinetic energy converter means coupled to the output of said inertial means for changing said kinetic energy into a continuous rotary motion.

8. A wave motor as defined in claim 7 wherein said kinetic energy converter means comprises:
   an electrical power generator.

9. A wave motor as defined in claim 1 including:
   conduit means having an inlet port located within said inertial means for withdrawing a portion of the medium in which said surface waves are propagated, and having an exit port for discharging said medium portion exteriorly of said inertial means.

10. Apparatus for converting surface wave energy into useful rotational kinetic energy, comprising:
    impedance transformation means immersed in a wave propagating medium for interception of surface waves propagated therein, said waves comprising both potential and kinetic energy, and for converting said waves to pulses of predominately kinetic energy;
    inertial means, having an input coupled to said impedance transformation means, for receiving and temporarily storing said pulses of kinetic energy, and having an output from which continuous gradual withdrawal of said kinetic energy is obtained;
    kinetic energy converter means, having a rotating output shaft coupled to the output of said inertial means for changing the kinetic energy supplied thereto into a continuous rotary motion of said output shaft; and,
    discharge means downstream of said converter means for expelling the wave propagating medium passing through said apparatus.

11. Apparatus as defined in claim 10 wherein said impedance transformation means comprises:
    a refractive horn having substantially non-reflective flare rate.

12. Apparatus as defined in claim 10 wherein said inertial means comprises:
    a circular vessel having an inlet and an outlet; and, turning vanes being disposed at said inlet for imparting a vortex motion to said medium.

13. Apparatus as defined in claim 12 wherein said kinetic energy converter means comprises:
    a turbine.

14. Apparatus as defined in claim 10 wherein said discharge means comprises:

a diffuser communicating the interior of said apparatus with the exterior environment thereof.

15. Apparatus as defined in claim 10 wherein said input to said inertial means is applied at the radius of gyration thereof.

16. A wave motor as defined in claim 10, wherein the axis of said inertial means is horizontal.

17. A wave motor as defined in claim 11, wherein the throat of said horn extends parallel to the axis of the inertial means.

18. A wave motor as defined in claim 10, wherein said impedance transformation means comprises:

a non-reflective ramp.

19. Apparatus as defined in claim 12 wherein said turning vanes are shaped to conform to refractive ray paths.

20. Wave motor apparatus for converting surface wave energy propagated via a liquid medium into useful rotating shaft power, comprising:

a refractive horn means having a mouth portion and a throat portion non-reflectivity transforming the intercepted surface waves at said mouth portion to pulses of predominatly kinetic energy at said throat portion;

a hollow cylindrical standpipe having an input end and an output end, said input end being coupled to the throat portion of said refractive horn for receiving and temporarily storing said pulses of kinetic energy;

turbine means, having an output shaft, for receiving kinetic energy supplied thereto from said standpipe, and imparting a continuous rotary motion to its output shaft; and, diffuser means located downstream of said turbine for discharging the liquid medium passing through said apparatus.

* * * * *